United States Patent [19]

Nelson

[11] 4,013,161
[45] Mar. 22, 1977

[54] ACCUMULATING ROLLER CONVEYOR

[75] Inventor: Walter T. Nelson, Frederick, Md.

[73] Assignee: American Chain & Cable Company, Inc., Bridgeport, Conn.

[22] Filed: Feb. 3, 1976

[21] Appl. No.: 654,991

[52] U.S. Cl. .............................. 198/781; 198/444; 198/789

[51] Int. Cl.² ....................................... B65G 13/07

[58] Field of Search ........................ 198/34, 127 R

[56] References Cited

UNITED STATES PATENTS

| | | | |
|---|---|---|---|
| 3,012,652 | 12/1961 | Poel et al. | 198/127 R |
| 3,513,960 | 5/1970 | Adams | 198/127 R |
| 3,527,586 | 9/1970 | Ritter, Jr. | 198/127 R |
| 3,537,569 | 11/1970 | Leach | 198/127 R |
| 3,605,990 | 9/1971 | Cowen, Jr. | 198/127 R |
| 3,610,406 | 10/1971 | Fleischauer et al. | 198/127 R |
| 3,643,788 | 2/1972 | Wentz | 198/127 R |
| 3,667,589 | 6/1972 | Constable | 198/127 R |
| 3,729,088 | 4/1973 | Stein et al. | 198/127 R |
| 3,768,630 | 10/1973 | Inwood et al. | 198/127 R |
| 3,877,565 | 4/1975 | Werntz | 198/127 R |

Primary Examiner—Johnny D. Cherry
Assistant Examiner—Richard K. Thomson
Attorney, Agent, or Firm—Barnes, Kisselle, Raisch & Choate

[57] ABSTRACT

An accumulating roller conveyor comprising a frame, a plurality of longitudinally spaced transversely extending drive rollers rotatably mounted on the frame, a drive extending longitudinally of the frame, and a spring clutch interposed between each drive roller and the drive. A driven roller is rotatably mounted on the frame upstream of each drive roller and an endless belt interconnects the driven and drive roller such that when the drive roller is rotated, the driven roller is rotated. A sensing roller is rotatably mounted on the frame upstream and adjacent each driven roller, and a one-way clutch is provided on each sensing roller. An endless belt interconnects the driven roller and the one-way clutch such that when the driven roller is rotated, the sensing roller is rotated. An endless belt interconnects the sensing roller and the drive roller upstream therefrom such that when a downstream sensing roller is stopped from rotating by the presence of an article thereon, the spring clutch of the drive roller upstream therefrom will be disengaged to stop the drive roller and, in turn, stop the driven roller upstream therefrom, and when a succeeding article engages the previously interrupted article, the upstream sensing roller will stop initiating a sequence to interrupt the drive and driven rollers further upstream, and when the first mentioned article is released, the sensing roller thereunder is permitted to rotate so that the spring clutches and one way clutches are successively engaged upstream.

7 Claims, 3 Drawing Figures

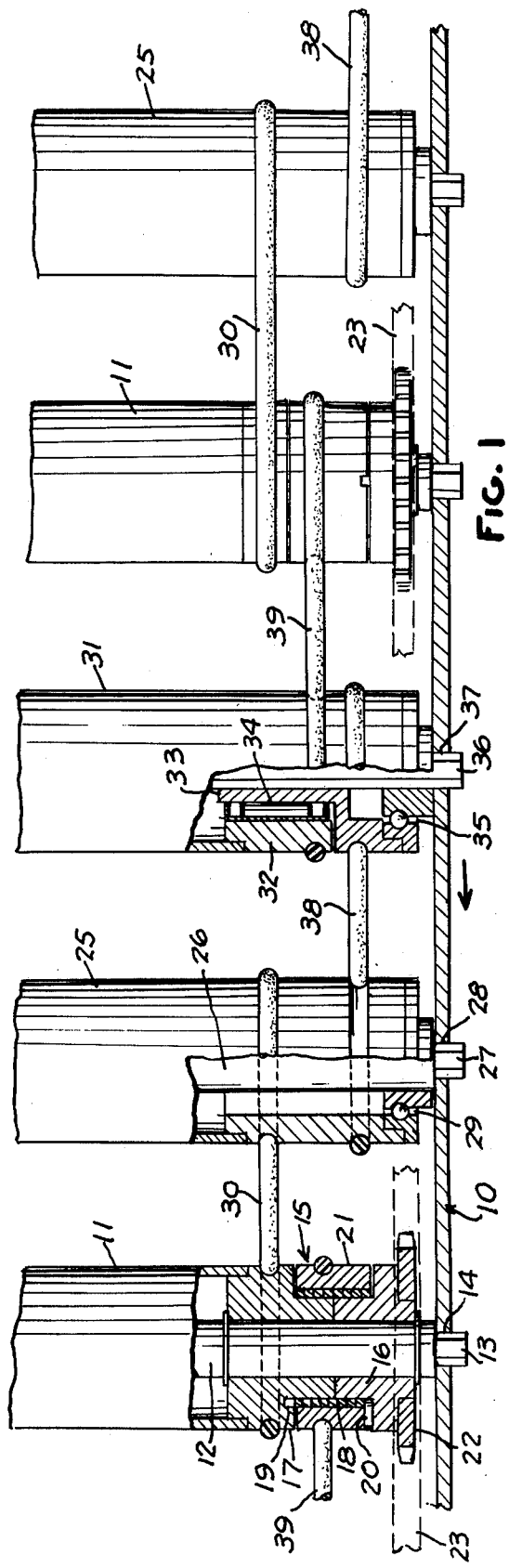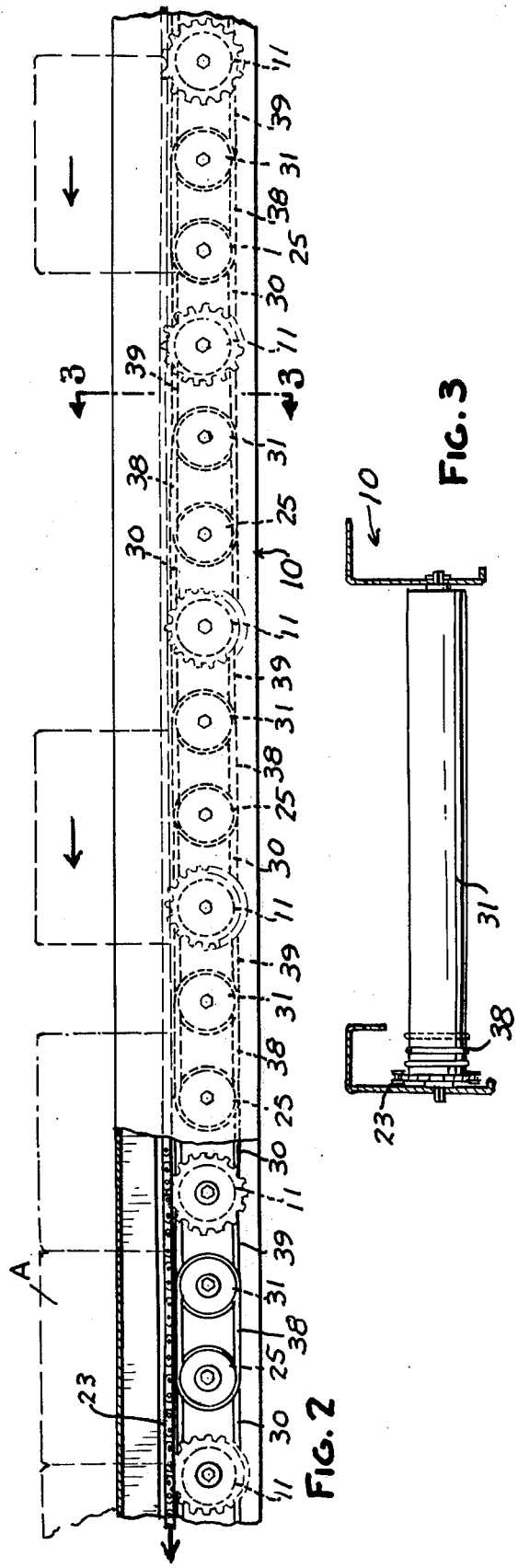

ACCUMULATING ROLLER CONVEYOR

This invention relates to accumulating roller conveyors.

BACKGROUND OF THE INVENTION

In the use of roller conveyors for transporting articles, it has become, in some instances, necessary to provide a means for interrupting the drive to the rollers when an article is stopped in its movement because of a barrier or the like. Such conveyors known as accumulating conveyors have either been of the type wherein the drive to the rollers is lessened so that there is slippage to the drive rollers or of the type wherein the drive rollers are completely interrupted in their movement by moving the drive means, such as a belt or chain, away from the drive roller or interrupting the drive by the use of clutches.

Among the objects of the invention are to provide a roller conveyor of relatively simple construction which obviates the use of intricate mechanisms or linkages and therefore is easier to manufacture, lower in cost, and easier to maintain.

SUMMARY OF THE INVENTION

In accordance with the invention, the accumulating roller conveyor comprises a frame, a plurality of longitudinally spaced transversely extending drive rollers rotatably mounted on the frame, drive means extending longitudinally of the frame, and a spring clutch interposed between each drive roller and the drive means. A driven roller is rotatably mounted on the frame upstream of each drive roller, and means interconnect the driven and drive rollers such that when the said drive roller is rotated, the driven roller is rotated. A sensing roller is rotatably mounted on the frame upstream and adjacent each driven roller and a one-way clutch is provided on each sensing roller. Means interconnect the driven roller and the one-way clutch of the sensory roller such that when the driven roller is rotated, the sensing roller is rotated. Means interconnect the sensing roller and the drive roller upstream therefrom such that when a downstream sensing roller is stopped from rotating by the presence of an article thereon, the spring clutch of the drive roller upstream therefrom will be disengaged to stop the drive roller and, in turn, top the driven roller upstream therefrom, and when a succeeding article engages the previously interrupted article, the upstream sensing roller will stop initiating a sequence to interrupt the drive and driven rollers further upstream, and when the first mentioned article is released, the sensing roller thereunder is permitted to rotate so that the spring clutches and one way clutches are successively engaged upstream.

DESCRIPTION OF THE DRAWINGS

FIG. 1 is a fragmentary part sectional plan view of a conveyor embodying the invention.

FIG. 2 is a fragmentary part sectional side elevational view of the same.

FIG. 3 is a fragmentary sectional view taken along the line 3—3 in FIG. 2.

DESCRIPTION

Referring to FIGS. 1–3, the conveyor embodying the invention comprises a frame 10 that includes spaced rails, only one of which is shown in FIGS. 1 and 2.

Driven rollers 11 are rotatably mounted between the rails of the conveyor frame by a structure which includes a shaft 12 having a hexagonally shaped end 13 fitting into openings 14 in the frame 10. The roller 11 is rotatably mounted on the shaft 12 and is driven through a spring clutch 15 which includes an input member 16 and an output member 17, the latter forming the end of the roller 11. The spring clutch 15 includes spring 18 wound around the periphery of portions of the hubs 16, 17, and including one axial end 19 that is fixed to the output hub 17 and a radial tab 20 at the other end that extends into a sleeve 21. The hub 16 supports a sprocket 22 that engages an endless chain 23 so that the sprocket 22 and the input member 16 are continuously rotated. Normally, the rotation of the sprocket 22 functions through the spring 18 to drive the output member 17 and, in turn, the roller 11 carrying the articles in the direction of the arrow as shown in FIGS. 1 and 2.

The conveyor further inclues a driven roller 25 upstream from each drive roller 11 and rotatably mounted on a shaft 26 having hexagonal ends 27 extending into openings 28 in the frame 10 and bearings 29 supporting the roller 25 on the shaft 26. An endless flexible belt 30 is trained over the adjacent drive roller 11 and driven roller 25 so that whenever the drive roller 11 is rotated, the driven roller 25 is also rotated.

The conveyor further includes a sensing roller 31 mounted upstream of the driven roller 25 and adjacent the upstream drive roller 11. The sensing roller 31 is fixed to the output member 32 of a one-way clutch 33. The input member 34 of the one-way clutch is rotatably mounted by a bearing 35 on the shaft 36 which also has hexagonal ends extending into openings 37 in the frame 10. An endless belt 38 interconnects the driven roller 25 and the input member 34 so that when the driven roller 25 is rotated, the input member 34 is rotated to rotate the sensing roller 31. The sensing roller 31 is also drivingly interconnected with the upstream drive roller 11 by an endless belt 39. The endless belts 30, 38, and 39 are trained in grooves in the respective rollers and members.

Normally, the drive rollers 11 are continuously rotated to in turn rotate the driven rollers 25 and associated sensing rollers 31 to move the articles in the direction of the arrow as shown in FIG. 2.

When an article A is interrupted in its movement due to engagement with a preceding article or a barrier, the sensing roller 31 underlying the article is interrupted in its movement. This will cause the collar 21 on the upstream roller 11 to stop and thereby disengage the spring clutch 15 thereof and, in turn, disengage the upstream drive roller 11 from its sprocket drive. The stopper of drive roller 11 also stops the upstream driven roller 25 and tend to stop sensing roller 31 associated therewith.

With respect to the associated sensing roller, only the inner race or input member 34 will be interrupted and the sensing roller will free wheel with respect to the downstream drive roller 11. However, the sensing roller 31 will continue to be driven through the belt 39 from the upstream drive roller because of the high overrunning drag of the spring clutch control collar.

When a succeeding article engages the previously stopped article, the sensing roller 31 will stop or slow down starting the sequence for the next upstream zone. As the first mentioned Article A is released, the sensing roller 31 will be permitted to turn engaging the succeeding clutches sequentially.

I claim:

1. In an accumulating roller conveyor, the combination comprising
   a frame,
   a plurality of longitudinally spaced transversely extending drive rollers rotatably mounted on said frame,
   drive means extending longitudinally of said frame,
   and a spring clutch interposed between each said drive roller and said drive means,
   a driven roller rotatably mounted on said frame upstream of each said drive roller,
   means interconnecting said rollers such that when said drive roller is rotated, said driven roller is rotated,
   a sensing roller rotatably mounted on said frame upstream and adjacent each said driven roller,
   a one-way clutch on each said sensing roller,
   means interconnecting said driven roller and said one-way clutch such that when said driven roller is rotated, said sensing roller is rotated,
   and means interconnecting said sensing roller and the drive roller upstream therefrom such that when a downstream sensing roller is stopped from rotating by the presence of an article thereon, the spring clutch of the drive roller upstream therefrom will be disengaged to stop the drive roller and, in turn, stop the driven roller upstream therefrom, and when a succeeding article engages the previously interrupted article, the upstream sensing roller will stop initiating a sequence to interrupt the drive and driven rollers further upstream, and when the first mentioned package is released, the sensing roller thereunder is permitted to rotate so that the spring clutches and one-way clutches are successively engaged upstream.

2. The combination set forth in claim 1 wherein said drive means comprises a sprocket rotatably mounted about the axis of each drive roller and endless chain means engaging the sprockets of said drive rollers.

3. The combination set forth in claim 1 wherein said means interconnecting said drive and driven rollers comprises an endless belt.

4. The combination set forth in claim 1 wherein said means interconnecting said driven and sensing rollers comprises a belt.

5. The combination set forth in claim 1 wherein said means interconnecting said sensing and drive rollers comprises a belt.

6. In an accumulating roller conveyor, the combination comprising
   a frame,
   a plurality of longitudinally spaced transversely extending drive rollers rotatably mounted on said frame,
   drive means extending longitudinally of said frame,
   and a spring clutch on the axis of said drive roller including an input member driven by said drive means, an output member fixed to said roller and spring means engaging said input and output members,
   a driven roller rotatably mounted on said frame upstream of each said drive roller,
   an endless belt interconnecting said drive and driven rollers such that when said drive roller is rotated, said driven roller is rotated,
   a sensing roller rotatably mounted on said frame upstream and adjacent each said driven roller,
   a one-way clutch on the axis of each said sensing roller, including an input member and an output member connected to said sensing roller,
   an endless belt interconnecting said driven roller and said input member of said one-way clutch such that when said driven roller is rotated, said sensing roller is rotated,
   and an endless belt interconnecting said sensing roller and the drive roller upstream therefrom such that when a downstream sensing roller is stopped from rotating by the presence of an article thereon, the spring clutch of the drive roller upstream therefrom will be disengaged to stop the drive roller and, in turn, stop the driven roller upstream therefrom, and when a succeeding article engages the previously interrupted article, the upstream sensing roller will stop initiating a sequence to interrupt the drive and driven rollers further upstream, and when the first mentioned package is released, the sensing roller thereunder is permitted to rotate so that the spring clutches and one-way clutches are successively engaged upstream.

7. The combination set forth in claim 6 wherein said drive means comprises a sprocket rotatably mounted about the axis of each drive roller and endless chain means engaging the sprockets of said drive rollers.

* * * * *